Figure 1:
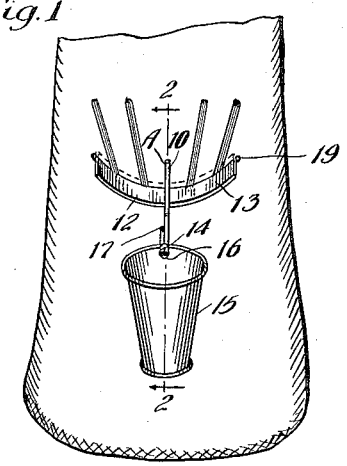

E. R. PHILIP.
COMBINED APRON AND CUP SUPPORTING DEVICE.
APPLICATION FILED JUNE 8, 1912.

1,091,699.

Patented Mar. 31, 1914.

Witnesses
Wm. Geiger
H. W. Munday

Inventor:
Ernest R. Philip
By Munday, Evarts, Adcock & Clarke,
Attys.

COLUMBIA PLANOGRAPH CO., WASHINGTON, D. C.

UNITED STATES PATENT OFFICE.

ERNEST R. PHILIP, OF ATLANTA, GEORGIA, ASSIGNOR TO AMERICAN CAN COMPANY, OF NEW YORK, N. Y., A CORPORATION OF NEW JERSEY.

COMBINED APRON AND CUP SUPPORTING DEVICE.

1,091,699.     Specification of Letters Patent.     Patented Mar. 31, 1914.

Application filed June 8, 1912. Serial No. 702,471.

*To all whom it may concern:*

Be it known that I, ERNEST R. PHILIP, a citizen of the United States, residing in Atlanta, in the county of Fulton and State of Georgia, have invented a new and useful Improvement in Combined Apron and Cup Supporting Devices, of which the following is a specification.

This invention relates to improvements in combined sap apron and cup supporting devices, and relates more particularly to devices of the type indicated which are used in collecting turpentine by the cupping method, as distinguished from the box cutting method, although the improvements are susceptible of use in other ways, as will be obvious to those skilled in the art.

It has formerly been customary to support the aprons and collecting cups used in gathering sap from trees in either of two ways, the first of which consists in sustaining the weight of the cup and contents by means of nails or similar devices driven into the tree and on which the cups rest, and having the aprons stuck into a cut in the tree and supported in that manner; and the second of which consists in forming a deep cut in the tree and securing the apron therein and supporting the cup by the apron.

The first method described presents many objections, since it necessitates the several operations of driving in a plurality of nails at each tree, gashing the tree and inserting the apron and placing the cup, and the result is that, with unskilled labor, generally negroes employed in this work, the apron and cup are not properly placed relatively to each other, oftentimes resulting in a waste of sap, and when the cups are removed from the nails or other supporting members, the latter are left in the tree, which subsequently causes damage to the saws when the trees are being cut at the saw mills.

With the second method, above described, an excessively deep gash extending well into the body of the tree below the bark is required in order to properly hold the apron and the weight of the cup and contents, and the formation of this deep gash requires special tools and requires considerable time, and it often occurs that the cup and apron become dislodged from the tree when the cup becomes partially filled, due to the fact that the apron has been previously loosened during the operations of emptying the cups.

As is well known in this art, especially in connection with turpentine collecting, the apron and cup are moved up the tree each year for several years, and hence with the old methods of collecting the sap by cupping as hereinbefore described, it will be seen that each year the same troubles are encountered and the objectionable features multiplied each time that the cup and apron are moved.

The object of my invention is to provide a device which will be free from all the foregoing indicated objectionable features, and which may be used with any of the common forms of apron and cup now in use, and which will materially reduce the cost of labor required to set up, allow of easy adjustment of the apron at any time relatively to the cup, absolutely prevent possibility of metal being left in the trees after the tapping of the trees has been completed, and also prevent damage or unnecessary mutilation of the tree.

Another object of the invention is to provide a new and improved form of spout, which coöperates readily with the improved combined apron and cup holder and which lends itself readily to easy adjustment on different sized trees.

The invention furthermore consists in the improvements in the parts and devices and in the novel combination of parts and devices herein shown, described or claimed.

Figure 2:
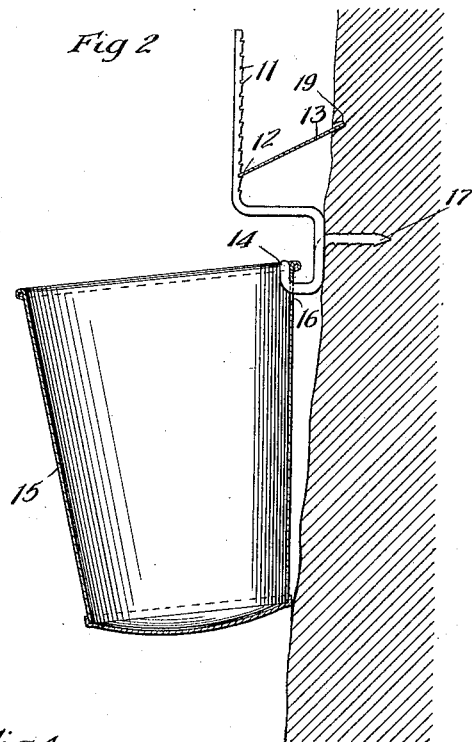
Figure 3:
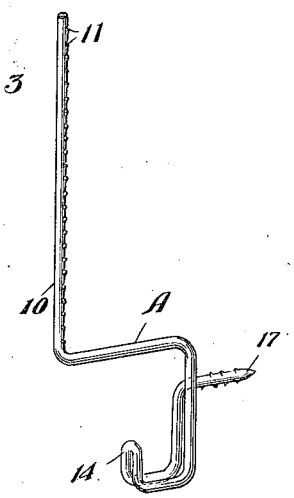
Figure 4:
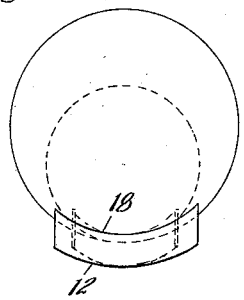

In the drawing forming a part of this specification, Figure 1 is a side elevation of a portion of a tree showing my improvements in connection therewith. Fig. 2 is a vertical sectional view, taken on the line 2—2 of Fig. 1 and being upon a somewhat enlarged scale. Fig. 3 is a detail, perspective view of the improved combined apron and cup support and Fig. 4 is a diagrammatic plan view, illustrating the method of adjusting the improved apron to trees of various diameters.

In the drawing, the combined apron and cup support is designated generally by the reference A, and the same is provided with a vertically extending portion 10, the same being inherently resilient, and having an inner face provided with a plurality of incisions or notches 11, 11, in which is adapted to be engaged the front edge 12 of the apron 13, whereby said edge may be adjusted vertically after the support A has been secured to the tree. The support A is also furthermore provided with a hook portion 14 adapted to engage and support a cup 15 in any suitable manner, such, for instance, as by engaging through a hole 16 in the cup. The support A is also furthermore provided with a prong 17, the same being preferably barbed, and which is adapted to be driven into the tree in the same manner as a nail, to secure the support to the tree. As shown in the drawing, the support A is made of a single piece of wire which, as will be obvious, will have a certain amount of inherent flexibility and resiliency, but, it will be understood that the combined apron and cup support may be made of other material and in modified forms.

The apron 13, as shown, consists of a strip of galvanized iron, the same having a concave inner edge 18 and having its outer edge 12 convex. These strips for the apron may be supplied to the trade with certain constant curves and adapted for trees of small, medium and large size, but as will be obvious, on account of the inner concave edge formation, the apron may be adjusted from a tree of large diameter to a tree of smaller diameter by concaving the same upwardly from the position shown in full in the diagrammatic sketch, Fig. 4, to the position shown in dotted lines therein. Hitherto, so far as I am aware, these aprons have been furnished to the trade with straight inner edges, and as will be apparent, are not adjustable to trees of different sizes.

In using my improvements, the trees are first scored or gouged, after which the supports are secured to the tree. After this the cups are hung upon the hooks 14 and the apron placed with its inner edge in the gouge 19 and the outer edge 12 adjusted on the inner face of the portion 10, and due to the resiliency of the portion 10, the apron will be held in position on the tree without necessity of providing a deep gash in the tree as has hitherto been customary. It will also be noted that in resetting the cups and aprons each year, the support must be pulled from the tree, and when the tapping has been entirely completed, and when the supports are removed, no metal is left in the tree to cause damage at the saw mill.

Various changes and modifications may be made in the details of construction from that which I have shown and described, without departing from the spirit of the invention, and all such changes and modifications are contemplated as fall within the scope of the claims appended hereto.

I claim:—

1. A support of the class described, adapted to be secured to a tree and having a portion provided with a face adapted to engage one edge of an apron and to coöperate with the tree to retain the apron in position.

2. A support of the class described adapted to be secured to a tree and having a vertically extending portion spaced from the tree when secured thereto, said portion being serrated on the face adjacent the tree to thereby hold one edge of an apron, substantially as specified.

3. A support of the class described, adapted to be secured to a tree and having one portion provided with a face adapted to engage one edge of an apron and to coöperate with the tree to retain the apron in position, and another portion adapted to engage and support a cup, said portions being integrally formed.

4. A support of the class described, having a portion thereof provided with a face adapted to engage one edge of an apron and having an integrally formed prong adapted to be driven into the tree, whereby to secure the support to the tree.

5. A support of the class described, having a portion thereof adapted to engage a cup and support the same in position, and having a prong formed integrally therewith, said prong being adapted to be driven into the tree whereby to secure the support to the tree.

6. A support of the class described, having one portion provided with a face adapted to engage one edge of an apron and another portion adapted to engage and support a cup, and a prong integrally formed with said portions, said prong being adapted to be driven into the tree whereby to secure the support thereto.

7. A support of the class described adapted to be secured to a tree and having an inherently resilient portion provided with a face adapted to engage one edge of an apron and to coöperate with the tree to retain the apron in position, and means on said face for adjustably holding one edge of the apron in various positions.

8. A support of the class described adapted to be secured to a tree and having an inherently resilient portion provided with a face adapted to engage one edge of an apron and to coöperate with the tree to retain the apron in position, means on said face for adjustably holding one edge of the apron in various positions, and a securing prong formed integrally with said portion.

9. A support of the class described, having an inherently resilient portion provided with a face adapted to engage one edge of an apron and having another portion adapted to engage and support a cup, said portions being formed integrally and having also a securing prong integrally formed therewith, and means for adjusting the edge of the apron along said face.

ERNEST R. PHILIP.

Witnesses:
W. HOWARD SMITH,
C. M. FALL.